Figure 1:
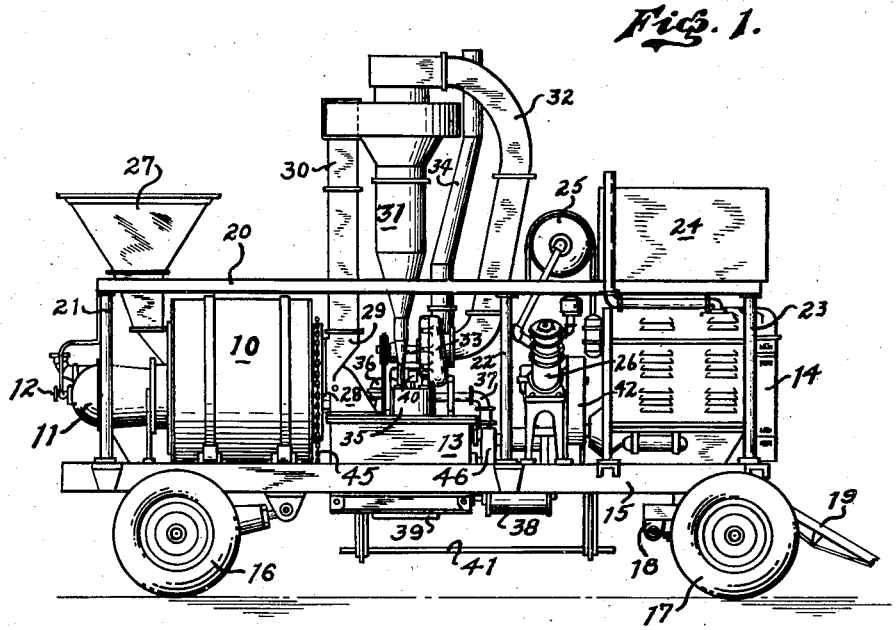

April 2, 1946.  J. L. WATERS  2,397,581
APPARATUS FOR PREPARING PAVING MATERIALS
Filed Aug. 23, 1944  2 Sheets-Sheet 1

INVENTOR.
JOHN L. WATERS.
BY

April 2, 1946.  J. L. WATERS  2,397,581
APPARATUS FOR PREPARING PAVING MATERIALS
Filed Aug. 23, 1944   2 Sheets-Sheet 2

INVENTOR.
JOHN L. WATERS.
BY
*W. H. Atkinson*
ATTORNEY

Patented Apr. 2, 1946

2,397,581

UNITED STATES PATENT OFFICE 2,397,581

APPARATUS FOR PREPARING PAVING MATERIALS

John Landon Waters, Salem, Oreg., assignor to Dallas Machine & Locomotive Works, Inc., Dallas, Oreg., a corporation of Oregon Application August 23, 1944, Serial No. 550,805

7 Claims. (Cl. 259—159)

My present invention relates to road paving machinery, and more particularly to a new and improved apparatus for heating and mixing crushed rock and other aggregate with asphalt, tar and the like at a location close to the point of its application to a highway.

In the preparation of paving materials of the type commonly used for paving and resurfacing highways, it is the practice to heat the rock or other aggregate prior to a mixing of the same with a heated bituminous binder. In this operation the heating of the rock or other aggregate is generally carried out in a rotatable drum and, as a result, considerable of the finer particles of the aggregate, in the form of dust, are set free and if provisions are not made for receptivating the same, they will be dissipated in the atmosphere to the damage of property and vegetation thereabout and also lost to any useful purpose. The consequent loss of this dust in the ultimate mixture has been found to greatly reduce the binding characteristics of the paving material and it is, therefore, a principal object of my present invention to provide an improved apparatus by which the dust set free and/or created during the heating of the aggregate, may be substantially entirely recovered and returned to the heated batch after the batch has been introduced into a pug mill and there thoroughly remixed with the heated aggregate and the liquid ingredient of the paving material.

A further object of the invention is to provide an arrangement wherein the dust collecting elements of my improved apparatus will serve the additional function of establishing a circulation of air for the combustion chamber which is associated with the heating drum.

Another object of the invention is to provide an arrangement wherein the operation of the dust collecting apparatus may be controlled in such a manner that the collected dust, taken from any batch of heated aggregate, may be returned to that particular batch of aggregate and thus maintain the proper proportions of fineness in the mixture.

Another object of the invention is to provide a dust collecting means in which the combined action of a cyclone dust collector and a centrifugal dust separator is utilized in a new and novel manner in connection with an aggregate heating drum and a pug mill.

Another object of the invention is to provide an arrangement wherein the dust collecting apparatus will operate throughout the entire heating cycle and while the aggregate is being discharged into a pug mill and subsequently rendered inoperative with respect to the dust collected thereby as the latter is discharged into the pug mill.

Another object of the invention is to provide a simple, compact and practical arrangement of apparatus for the purpose intended which can be easily transported to a place of use and conveniently operated by a minimum number of attendants.

Other objects and advantages of the present invention will be in part evident to those skilled in the art, and in part pointed out hereinafter in the following description taken in connection with the accompanying drawings, wherein there is shown by way of illustration and not of limitation a preferred embodiment of the invention.

Figure 3:
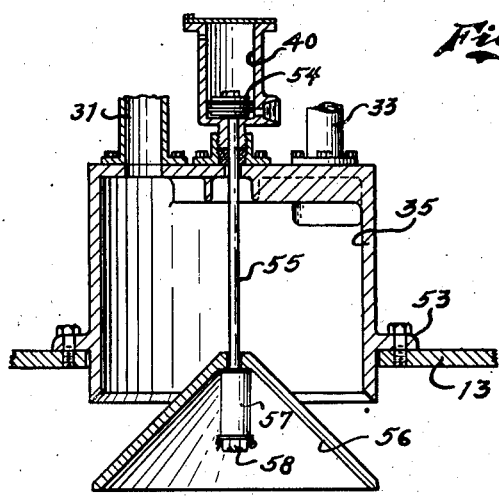
Figure 2:
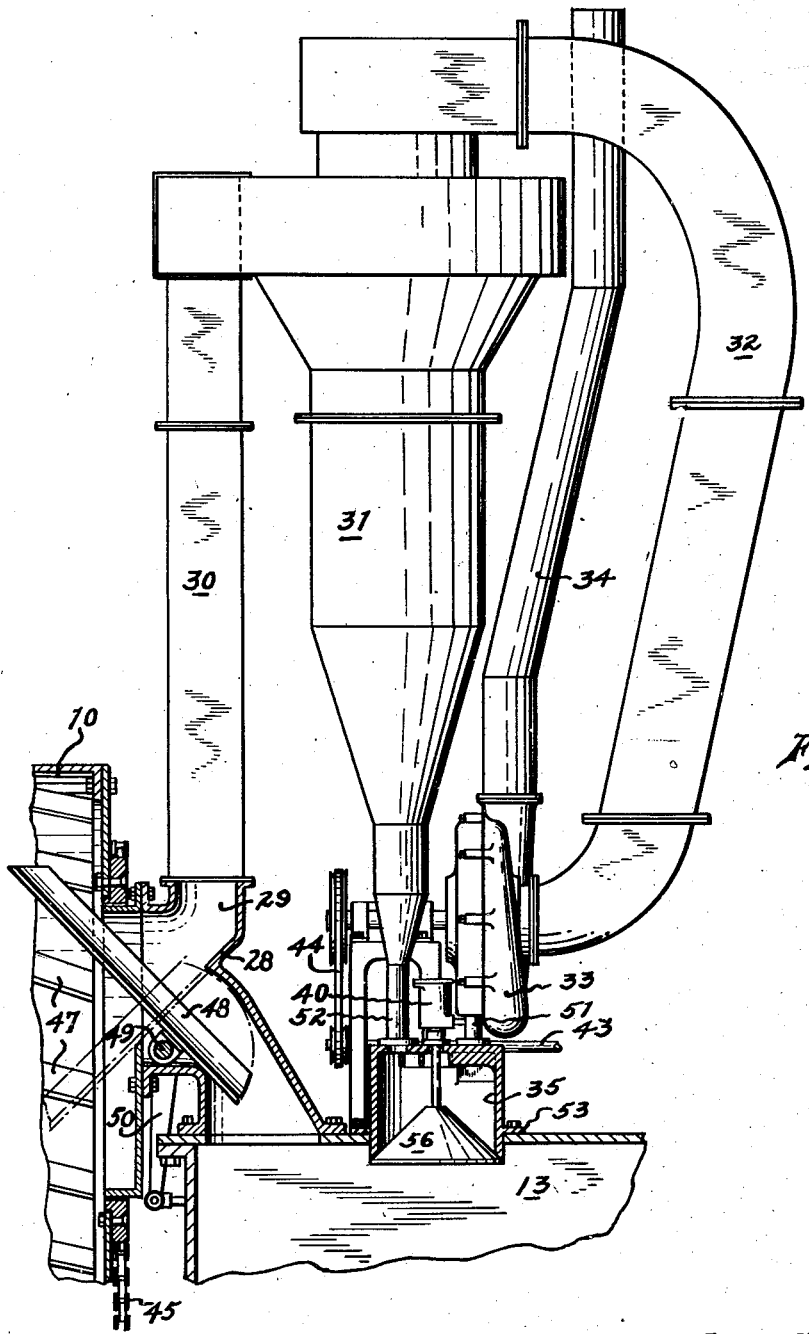

In the drawings:

Figure 1 is a side elevation showing a preferred form of my improved apparatus as mounted upon a wheeled chassis for convenient movement from one point to another, Figure 2 is an enlarged fragmentary view showing in detail some of the features of my invention as illustrated in Figure 1 of the drawings, and Figure 3 is a fragmentary sectional view of the invention and showing a further detail of its construction.

As is shown more completely in Figure 1 of the drawings, my improved apparatus includes, among other elements, a solid particle or aggregate agitating and heating drum 10 with which there is associated a combustion chamber 11 which is fired by a conventional oil burner 12. At its other end the heating drum 10 is arranged to discharge its contents in the form of heated material directly into a pug mill 13 which, like the drum 10, is arranged to be driven by a Diesel engine or power plant 14 that is mounted at the forward end of a trailer-type chassis 15. This chassis 15 is of a conventional design and is here shown as supported by suitable pneumatically tired wheels 16 and 17. The wheels 17 are carried by a steerable axle assembly 18 that is adapted to be attached to a towing vehicle by means of a tow-bar 19. The chassis 15 also carries an elevated frame structure 20 that is supported by stanchions 21, 22 and 23 that are spaced at proper points along the length of the chassis 15. Mounted upon the elevated frame structure 20 and immediately above the power plant 14, there is a fuel tank 24 in which fuel for the oil burner 12 and the power plant 14 may be carried. Adjacent the fuel tank 24 the frame structure 20 also carries a compressed air reservoir 25 that is adapted to be maintained under pressure by means of an air compressor 26 which is adapted to be driven by the power plant 14. A hopper 27 is also shown as supported at the other end of the frame structure 20 and at a point from which the aggregate may be efficiently introduced into the rotatable drum 10. Associated with the pug mill 13 and communicating with the interior of the rotatable drum 10, there is a manifold 28 that has a downwardly disposed aggregate discharge outlet and an upwardly extending suction conduit 29, to the latter of which an inlet pipe 30 of a cyclone dust collector 31 is connected. In this arrangement the outlet of the cyclone dust collector 31 is connected through a conduit 32 to the intake of a centrifugal dust separator 33 from which the dust free air is discharged through a stack 34. At its discharge outlet the cyclone dust collector 31 is shown as connected to a dust accumulating chamber 35 which, as will hereinafter appear, is provided with a valved outlet through which the dust accumulated therein may be discharged directly into the pug mill 13. Likewise, the dust discharge outlet of the centrifugal dust separator 33 is also connected to this dust accumulating chamber 35. In this arrangement it will be readily seen that all of the dust collected from any particular batch of aggregate may be again returned thereto and, as a result, the beneficial characteristics of the dust will be retained in the final mixture. When in operation the above described apparatus will be used with an independently operating asphalt or oil heating retort from which the hot liquid ingredient may be drawn. To insure a proper proportioning of the solid particles and the liquid ingredients, my device also contemplates the provision of a suitable pump (not shown) and a liquid metering device 36 from which the heated liquid ingredient is piped by a conduit 37 to the interior of the pug mill 13. In its preferred form the apparatus will include suitable shaft drives and a number of manually operated clutches which will serve to connect the power plant 14 with the various driven elements. In the apparatus shown these control devices are located on the far side, as viewed in this figure of the drawings, and where the elements to be controlled are located at more remote points, the operation thereof will be accomplished by compressed air. As for example, a compressed air cylinder 38 is shown as adapted to control and operate a slidable drip-proof discharge gate 39 located in the bottom of the pug mill 13 and which is adapted, when opened, to discharge the prepared paving material directly upon the highway, or into a suitable skip hoist bucket which may be provided for loading the material into a truck for transportation to another point of application to the highway. Similarly, the valved dust accumulating chamber 35 is provided with a pneumatic cylinder 40 that serves to control the discharge of the dust therefrom, as will be pointed out hereinafter. For convenience, the valves which control the admission of air to the pneumatic cylinders 38 and 40 will be located at a convenient point where an operator, standing upon a platform 41 suspended from the far side of the chassis 15, may control same.

At this point it should be stated that the chassis 15 also carries suitable bearings which support a line shaft (not shown) from which driving connections are established through the aforementioned manually controlled clutches to the several driven elements of the apparatus. In the arrangement illustrated the air compressor 26 is shown as connected to the main shaft of the power plant 14 by means of V-belts that are enclosed in a suitable housing 42. Likewise, the centrifugal dust separator is driven from a counter shaft 43 by a V-belt 44 and the rotatable aggregate heating drum 10 is shown as connected to the line shaft by means of suitable sprockets and a driving chain 45. The drive for the agitating elements of the pug mill 13 is established by the provision of a suitable clutch controlled reduction gearing 46 that is interposed in a conventional manner between the pug mill 13 and the line shaft.

Upon now referring to Figure 2 of the drawings it will be noted that the rotatable aggregate heating drum 10 is provided with spirally disposed shelf-like flanges 47 that will serve to agitate and elevate the aggregate as it is being heated, and in this way practically all of the dust and finer particles carried by a batch of aggregate introduced through the hopper 27 will be separated and withdrawn from the larger particles by the suction created in the intake conduit 30 of the cyclone dust collector 31. This will prevent an excessive heating of the dust and result in a more complete heating of the larger particles. Extending into the rotatable heating drum 10 and pivotally mounted within the manifold 28, there is a combined spout and damper forming member 48 that will operate, when in the position shown in full lines, to discharge the heated contents from the rotatable drum 10 and into the pug mill 13. When this combined spout and damper forming member 48 is moved into its other position, as indicated by dot and dash lines, it will operate to close the discharge outlet of the manifold 28. This will permit a continuous operation of the dust collecting apparatus without subjecting the collected dust to a withdrawal from the pug mill 13 when this dust is being introduced into the pug mill for remixing with the heated aggregate, as contemplated by the invention. The combined spout and damper forming member 48 is preferably mounted upon a shaft 49 that is adapted to be operated by a crank 50 which is controlled by a pneumatic piston and cylinder arrangement through the medium of a manually operated valve located within convenient reach of an attendant. As is more clearly illustrated in this figure of the drawings, the conduit 32 extends from a hood about the outlet of the cyclone dust collector 31 to the center of rotation of the centrifugal dust separator 33 and in this way the relatively small portion of the dust which is not collected by the cyclone dust collector 31 will be ultimately separated from the circulating air by centrifugal action and discharged into the dust accumulating chamber 35 through a discharge pipe 51. At the same time, that portion of the dust collected by the cyclone dust collector 31 will be discharged into the dust accumulating chamber 35 through a conduit 52.

By referring now to Figure 3 of the drawings it will be seen that the dust accumulating chamber 35 is supported upon the cover portion of the pug mill 13 by means of an annular flange 53 that extends therearound at a point slightly above its discharge end. With this type of mounting the lower end of the chamber 35 will extend into the interior of the pug mill 13. As a means for controlling the discharge of the dust from the dust accumulating chamber 35 to the interior of the pug mill 13, the pneumatic cylinder 40 is shown as carrying a piston 54 that operates through a piston rod 55 to raise a conically shaped valve or gate forming member 56 that will provide a bottom for the dust accumulating chamber 35 which may be dropped to discharge the dust into the pug mill 13. Because of its conical shape, this valve or gate forming member 56 will insure a complete discharge of the dust from the chamber 35 and, at the same time, the discharged dust will be uniformly distributed over the material within the pug mill 13. To insure a substantially non-chattering and tight seal between the bottom of the dust accumulating chamber 35 and the valve member 56 the piston rod 55 is shown as adapted to exert its holding force through a compressible rubber collar 57 that is held between the end thereof and below the valve member 56 by a nut 58.

Before describing the operation of my apparatus, it should be stated that in addition to the asphalt or oil heating retort from which heated asphalt or other liquid ingredient may be pumped through the metering device 36 and into the pug mill 13, the complete installation also includes a skip hoist of conventional design that is adapted to convey crushed rock or other aggregate from a pile or other source to the hopper 27. For convenience, this skip hoist is located on the far side of the apparatus, as viewed in Figure 1 of the drawings. Located on the near side of the apparatus, as shown in this figure of the drawings, there is a second skip hoist which is located substantially midway the ends of the chassis 15 where it is adapted to be positioned at a point immediately below the drip-proof gate 39 of the pug mill 13. This skip hoist is adapted to transfer the heated and prepared paving material to a suitable truck for transportation to the particular location where the material is to be applied. When the apparatus is thus set up, with the power plant 14 in operation and sufficient air pressure in the reservoir 25 to operate the various valves and the other pneumatically controlled devices previously referred to, a charge of crushed rock or other aggregate may be introduced into the heating drum 10. At this time the combined spout and damper forming member 48 will be in its non-discharging position within the manifold 28 and, as a result, the cyclone dust collector 31 and the centrifugal dust separator 33, which is here shown as of the "Rotoclone" type, will operate to create a combustion supporting draft through the combustion chamber 11 and also pick up and collect any dust set free by the agitation of the aggregate being heated. Now, after the aggregate has been heated to the desired degree, the combined spout and damper forming member 48 will be tipped into its discharging position by a pneumatic cylinder operating through the crank 50. This will cause the contents of the heating drum 10 to be discharged into the pug mill 13. During this operation the dust collecting apparatus will continue to withdraw dust from the discharging aggregate and will also serve to scavenge the heating drum 10 of any remaining dust. After the heated aggregate has been discharged from the heating drum 10, the combined spout and damper forming member 48 will be returned to its non-discharging position where it will seal off the suction conduit 30 from the interior of the pug mill 13. At this time it will be understood that the agitators of the pug mill will be in operation and, as soon as the suction conduit 30 has been sealed off therefrom, as above indicated, the asphalt pump may be set in operation to introduce through the metering device and the conduit 37 a measured quantity of the asphalt or other liquid ingredient in a proper proportion to the amount of aggregate previously introduced into the pug mill 13. During this latter operation, since the combined spout and damper forming member 48 is operating to seal off the pug mill from the dust collecting means, it will be seen that a new batch of crushed rock or other aggregate may be introduced into the heating drum 10 where it may be subjected to a heating preliminary to its introduction into the pug mill 13 for the mixing of a subsequent batch of the paving material, and thus the continuous operation of the device is insured. With the heated aggregate and the liquid ingredient of the paving mixture in the pug mill 13, the operator may now cut off the air from the cylinder 40 and permit the valve-like gate 56, at the bottom of the dust collecting chamber 35, to drop and thus discharge the collected dust into the pug mill 13 where it will be completely mixed in a distributed manner throughout the paving mixture. As a final operation, the attendant may open the discharge gate 39 of the pug mill 13 and thus empty the mixed contents of the pug mill into the skip hoist for loading in a delivery truck. From this it will be seen that in addition to preventing the loss and a consequent dispersion of dust about the vicinity of the apparatus, the dust collecting means will operate to collect substantially all of the dust contained in the dry aggregate as it is delivered to the hopper 27 and thus the beneficial properties of the dust will be retained in the ultimately delivered paving material.

While I have, for the sake of clearness and in order to disclose the invention so that the same can be readily understood, described and illustrated specific devices and arrangements, I desire to have it understood that the invention is not limited to the specific means disclosed, but may be embodied in other ways that will suggest themselves to persons skilled in the art. It is believed that this invention is new and it is desired to claim it so that all such changes as come within the scope of the appended claims are to be considered as part of this invention.

Having thus described my invention, what I claim and desire to secure by Letters Patent is:

1. In an improved dust collecting apparatus for paving material treating apparatus, the combination of a rotatable crushed rock agitating and heating drum, a pug mill adjacent one end of said drum, a manifold mounted in communicating relation with the interior of said drum having a downwardly extending discharge conduit leading to said pug mill and an upwardly extending suction conduit, a cyclone dust collector having its intake connected to the suction conduit of said manifold and a dust discharge conduit leading to said pug mill, and a combined spout and damper forming member pivotally mounted within said manifold adapted when in one position to connect said cyclone dust collector with the interior of said drum and prevent the withdrawal of dust from said pug mill and when in its other position to direct the heated material from said drum to said pug mill without interfering with the simultaneous withdrawal of dust from the drum while its contents is being discharge into the pug mill.

2. In an improved dust collecting apparatus for paving material preparing apparatus, the combination of a rotatable aggregate agitating and heating drum, a pug mill adjacent one end of said drum, a manifold mounted in communicating relation with the interior of said drum having a discharge conduit leading to said pug mill and an oppositely extending suction conduit, a continuously operating cyclone dust collector having its intake connected to the suction conduit of said manifold and a dust discharge conduit leading to said pug mill, and a combined spout and damper forming member pivotally mounted within said manifold adapted when in one position to connect said cyclone dust collector with the interior of said drum and with the interior of said pug mill and when in its other position to close the discharge conduit of said manifold leading to the pug mill to permit the full return of the collected dust to the pug mill without recirculation or interference with the simultaneous withdrawal of other dust from said agitating and heating drum.

3. In an improved dust collecting means for apparatus of the character described, the combination of a rotatable drum in which the solid particles of the paving material may be dried and heated to a predetermined degree, a pug mill in which the heated solid particles may be mixed with a liquid ingredient of the paving material, a continuously operating cyclone dust collector having its intake connected with the interior of said rotatable drum, a centrifugal dust separator connected to the outlet of said cyclone dust collector and providing a suction therethrough, means into which the dust collected and separated by said cyclone dust collector and said centrifugal dust separator is accumulated having a discharge outlet communicating with the interior of said pug mill, and a damper-like discharge chute leading from the interior of said rotatable drum to the interior of said pug mill adapted when in its operative position to permit the free flow of heated material from said rotating drum to said pug mill, and when in its inoperative position to close the opening to said pug mill whereby substantially all of the dust taken from a heated quantity of said solid particles may be returned to and retained in said pug mill when the discharge outlet of said dust accumulating means is opened.

4. In an improved dust collecting means for apparatus of the character described, the combination of a horizontally disposed rotatable drum in which the solid particles of a paving material may be dried and heated to a predetermined degree, a pug mill into which the heated solid particles may be discharged and mixed with a heated liquid ingredient of the paving material, a cyclone dust collector having its intake connected with the interior of said rotatable drum and said pug mill, a centrifugally operating dust separator connected to the outlet of said cyclone dust collector for providing a suction therethrough, a dust collecting chamber mounted above said pug mill into which the dust collected and separated by said cyclone dust collector and said centrifugally operating dust separator may be accumulated during the heating of said solid particles, means for discharging the contents of said dust collecting chamber into the interior of said pug mill during the mixing operation, and means for closing the connection between said cyclone dust collector and the pug mill when the collected dust is being returned thereto whereby the dust taken from any batch of solid particles from within said heating drum may be returned to and retained with said batch of the solid particles after its discharge into said pug mill.

5. In an improved dust collecting means for apparatus of the character described, the combination of a horizontally disposed rotatable drum in which the solid particles of a paving material may be dried and heated preparatory to mixing with a liquid ingredient, a pug mill in which the heated solid particles may be mixed with the heated liquid ingredient of the paving material, a manifold at the discharge end of said rotatable drum communicating with the interior thereof and providing a suction outlet and a discharge conduit for the heated solid particles, a cyclone dust collector having its intake connected to said manifold, a centrifugal dust separator connected to and providing a suction through said cyclone dust collector, a chamber into which the dust collected and separated by said cyclone dust collector and said centrifugal dust separator may be accumulated during a solid particle heating cycle and having a discharge outlet communicating with the interior of said pug mill, a combined spout and valve member mounted within said manifold adapted when in one position to direct the heated solid particles from said heating drum to said pug mill while permitting the withdrawal of dust therefrom and when in its other position to close the discharge conduit of said manifold and prevent the withdrawal of dust from said pug mill during a mixing operation, whereby the dust taken from any batch of solid particles from within said heating drum may be returned to and retained with said heated batch of solid particles after its discharge into said pug mill.

6. In an improved dust collecting means for apparatus of the character described, the combination of a horizontally disposed rotatable drum in which the solid particles of a paving material may be dried and heated preparatory to mixing with a liquid ingredient, a pug mill in which the heated solid particles may be mixed with the heated liquid ingredient of the paving material, a manifold connected at the discharge end of said rotatable drum communicating with the interior thereof and forming an air outlet and a discharge conduit for the heated solid particles, a dust collecting means having its intake connected to said manifold, a chamber into which the dust collected by said dust collecting means may be accumulated during a solid particle heating cycle and having a discharge outlet communicating with the interior of said pug mill, a combined spout and valve member mounted within said manifold adapted when in one position to direct the heated solid particles from said heating drum to said pug mill and when in its other position to close the discharge conduit of said manifold and prevent the withdrawal of dust from said pug mill during the mixing operation, whereby the dust taken from any batch of solid particles from within said heating drum may be returned to and mixed with said heated batch of solid particles after its discharge into said pug mill.

7. In an apparatus for preparing paving materials, the combination of a solid particle heating drum, a dust collecting means associated with said heating drum for collecting the dust set free by the agitation of said solid particles, a pug mill into which the heated solid particles are adapted to be discharged from said heating drum, a valve controlled chamber from which the dust collected by said dust collecting means may be discharged into said pug mill, a manifold to which the intake of said dust collecting means is connected having a discharge conduit through which the heated solid particles are discharged from said heating drum to said pug mill, and a movable solid particle directing chute mounted within said manifold and adapted when not in operation to close the discharge conduit of said manifold when the collected dust particles are being discharged from said valve controlled chamber into said pug mill.

JOHN LANDON WATERS.